United States Patent
Yamazaki (10) Patent No.: US 9,728,769 B2
(45) Date of Patent: Aug. 8, 2017

(54) METHOD OF MANUFACTURING ELECTRODE OF SECONDARY BATTERY BY ESD METHOD

(71) Applicant: TOYOTA JIDOSHA KABUSHIKI KAISHA, Toyota-shi, Aichi (JP)

(72) Inventor: Nobuyuki Yamazaki, Toyota (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 14/912,266

(22) PCT Filed: Jul. 11, 2014

(86) PCT No.: PCT/JP2014/003704
§ 371 (c)(1),
(2) Date: Feb. 16, 2016

(87) PCT Pub. No.: WO2015/029310
PCT Pub. Date: Mar. 5, 2015

(65) Prior Publication Data
US 2016/0211505 A1    Jul. 21, 2016

(30) Foreign Application Priority Data
Sep. 2, 2013  (JP) .................. 2013-181370

(51) Int. Cl.
*H01M 4/04* (2006.01)
*H01M 4/66* (2006.01)
*H01M 4/139* (2010.01)

(52) U.S. Cl.
CPC ....... *H01M 4/0419* (2013.01); *H01M 4/0471* (2013.01); *H01M 4/139* (2013.01); *H01M 4/661* (2013.01); *Y02P 70/54* (2015.11)

(58) Field of Classification Search
CPC .... H01M 4/0419; H01M 4/139; H01M 4/661; H01M 4/0471; Y02E 60/122; Y02P 70/54
(Continued)

(56) References Cited

U.S. PATENT DOCUMENTS

2006/0024579 A1*  2/2006  Kolosnitsyn ............ H01M 4/13
                                                        429/209
2011/0123866 A1   5/2011  Pan et al.
(Continued)

FOREIGN PATENT DOCUMENTS

| JP | 9-320569 A | 12/1997 |
| JP | 2003-338321 A | 11/2003 |

(Continued)

*Primary Examiner* — Dah-Wei D Yuan
*Assistant Examiner* — Jose Hernandez-Diaz
(74) *Attorney, Agent, or Firm* — Sughrue Mion, PLLC (57) ABSTRACT

The present invention aims to provide a multi-layer electrode. A method of manufacturing the multi-layer electrode according to the present invention is used in a secondary battery. The manufacturing method includes a process of sequentially spraying suspension liquid 51 to 54 that contain an active material onto a base material 50 to form two, three, four or more electrode layers 56 to 59. The process of forming the electrode layers 56 to 59 includes a process of spraying suspension liquid onto the base material 50 having a predetermined surface temperature to form an electrode layer 56 and a process of spraying suspension liquid onto the electrode layer 56 or another electrode layer having a surface temperature different from the predetermined surface temperature to form an electrode layer that is more distal than the electrode layer 56 with respect to the base material 50.

11 Claims, 8 Drawing Sheets (58) Field of Classification Search
USPC .......................................................... 427/58
See application file for complete search history.

(56) References Cited

U.S. PATENT DOCUMENTS

| | | | | |
|---|---|---|---|---|
| 2012/0295037 A1* | 11/2012 | Hagiwara | ........... | H01M 4/0404 |
| | | | | 427/542 |
| 2013/0189577 A1 | 7/2013 | Wang et al. | | |
| 2013/0309414 A1* | 11/2013 | Eskra | .................. | H01M 4/0404 |
| | | | | 427/557 |
| 2016/0013480 A1* | 1/2016 | Sikha | .................. | H01M 4/0404 |
| | | | | 427/126.6 |

FOREIGN PATENT DOCUMENTS

| | | |
|---|---|---|
| JP | 2010-251047 A | 11/2010 |
| JP | 2010-282873 A | 12/2010 |
| JP | 2013-16515 A | 1/2013 |
| JP | 2013-504168 A | 2/2013 |
| WO | 2011/029058 A1 | 3/2011 |
| WO | 2013/096220 A1 | 6/2013 |

\* cited by examiner

METHOD OF MANUFACTURING ELECTRODE OF SECONDARY BATTERY BY ESD METHOD

CROSS REFERENCE TO RELATED APPLICATIONS

This application is a National Stage of International Application No. PCT/JP2014/003704 filed Jul. 11, 2014, claiming priority based on Japanese Patent Application No. 2013-181370 filed Sep. 2, 2013, the contents of all of which are incorporated herein by reference in their entirety.

TECHNICAL FIELD

The present invention relates to a method of manufacturing an electrode of a secondary battery.

BACKGROUND ART

Further, Patent Literature 1 discloses a method of manufacturing a multi-layer electrode of a secondary battery using an ESD (Electro Spray Deposition) method. According to such a method, a plurality of spray devices are arranged and sequential spray coating is carried out to form the multi-layer electrode (FIG. 11 of Patent Literature 1).

Further, Patent Literature 1 discloses a method of introducing voids within an electrode prior to deposition of an electrode coating slurry onto an electrode support by using a slot-die method, not an ESD method (FIGS. 27A and 27B of Patent Literature 1).

CITATION LIST

Patent Literature

[Patent Literature 1] Published Japanese Translation of PCT International Publication for Patent Application, No. 2013-504168

SUMMARY OF INVENTION

Technical Problem

In order to secure the Li ion conductivity, a method of manufacturing a multi-layer electrode capable of adjusting porosity in an electrode layer is required. The present invention aims to provide a multi-layer electrode in which electrode layers having porosities different from one another are laminated by an ESD method that uses a plurality of spray devices.

Solution to Problem

A method of manufacturing a multi-layer electrode according to one aspect of the present invention is a method of manufacturing a multi-layer electrode used for a secondary battery, and includes a process of sequentially spraying suspension liquid that contains an active material onto a base material to form two or more electrode layers.

The process of forming the electrode layer includes: a process of spraying a first suspension liquid onto the base material or an existing electrode layer provided on the side of the base material having a predetermined surface temperature to form a primary electrode layer; and a process of spraying a second suspension liquid onto the primary electrode layer or another electrode layer having a surface temperature different from the predetermined surface temperature to form a subordinate electrode layer more distal than the primary electrode layer with respect to the base material.

Preferably, in the process of forming the primary electrode layer, the first suspension liquid is sprayed onto a surface of the base material. Preferably, in the process of forming the subordinate electrode layer, the second suspension liquid is sprayed onto a surface of a proximal electrode layer formed of one or more electrode layers including the primary electrode layer. Preferably, the surface of the proximal electrode layer has the other surface temperature.

Preferably, in the process of forming the primary electrode layer, the first suspension liquid is sprayed onto a surface of the existing electrode layer formed of one or more electrode layers. Preferably, in the process of forming the subordinate electrode layer, the second suspension liquid is sprayed onto a surface of a proximal electrode layer formed of two or more electrode layers including the primary electrode layer. Preferably, the surface of the proximal electrode layer has the other surface temperature.

Preferably, in the process of forming the primary electrode layer, the first suspension liquid is sprayed onto a surface of the base material or the existing electrode layer, the surface having the predetermined surface temperature.

Preferably, prior to the process of forming the subordinate electrode layer, a process of adjusting a surface temperature of a part or all of a surface of a proximal electrode layer formed of one, two, or more electrode layers including the primary electrode layer to the other surface temperature is further included. Preferably, in the process of forming the subordinate electrode layer, the second suspension liquid is sprayed onto the surface of the proximal electrode layer having the other surface temperature.

Preferably, prior to the process of forming the primary electrode layer, a process of adjusting a surface temperature of a part or all of a surface of the base material or the existing electrode layer to the predetermined surface temperature is further included. Preferably, a part or all of the surface of the proximal electrode layer is adjusted to the other surface temperature by adjusting the temperature of the base material.

Preferably, in the process of forming the multi-layer electrode layer, a continuous strip-shaped base material is delivered.

Preferably, prior to the process of forming the primary electrode layer, a predetermined area of the base material or the existing electrode layer is conveyed to a predetermined conveyance position from upstream to downstream in parallel to a direction in which a plurality of nozzles opposed to a surface side of the base material are aligned. Preferably, a surface temperature of the predetermined area is adjusted to the predetermined surface temperature in the predetermined conveyance position.

Preferably, in the process of forming the primary electrode layer, the first suspension liquid is sprayed onto a surface of the predetermined area by a predetermined nozzle of the plurality of nozzles to form a predetermined electrode layer.

Preferably, prior to the process of forming the subordinate electrode layer, the predetermined area and the primary electrode layer are further conveyed to another conveyance position in the downstream. Preferably, in the other conveyance position, a surface temperature of a proximal electrode layer formed of one, two, or more electrode layers including the primary electrode layer is adjusted to the other surface temperature.

Preferably, in the process of forming the subordinate electrode layer, the second suspension liquid is sprayed onto a surface of the proximal electrode layer by another nozzle located in the downstream of the predetermined nozzle of the plurality of nozzles. Preferably, in the process of forming the multi-layer electrode layer, a continuous strip-shaped multi-layer electrode layer is formed.

In each of the above aspects, the second suspension liquid may have a composition the same as that of the first suspension liquid. On the other hand, when the second suspension liquid has a composition different from that of the first suspension liquid, at least contents of a conductive auxiliary agent in the second suspension liquid are preferably different from those in the first suspension liquid.

In each of the above aspects, the predetermined surface temperature is preferably higher than the temperature of the first suspension liquid before it is sprayed onto the base material. The other surface temperature is preferably higher than the temperature of the second suspension liquid before it is sprayed onto the primary electrode layer or the other electrode layer.

In each of the above aspects, the base material is preferably a metallic foil. The other surface temperature is preferably higher than the predetermined surface temperature.

Advantageous Effects of Invention

According to the present invention, it is possible to provide a multi-layer electrode in which electrode layers having porosities different from one another are laminated by an ESD method that uses a plurality of spray devices.

DESCRIPTION OF EMBODIMENTS

Outline

Figure 1:
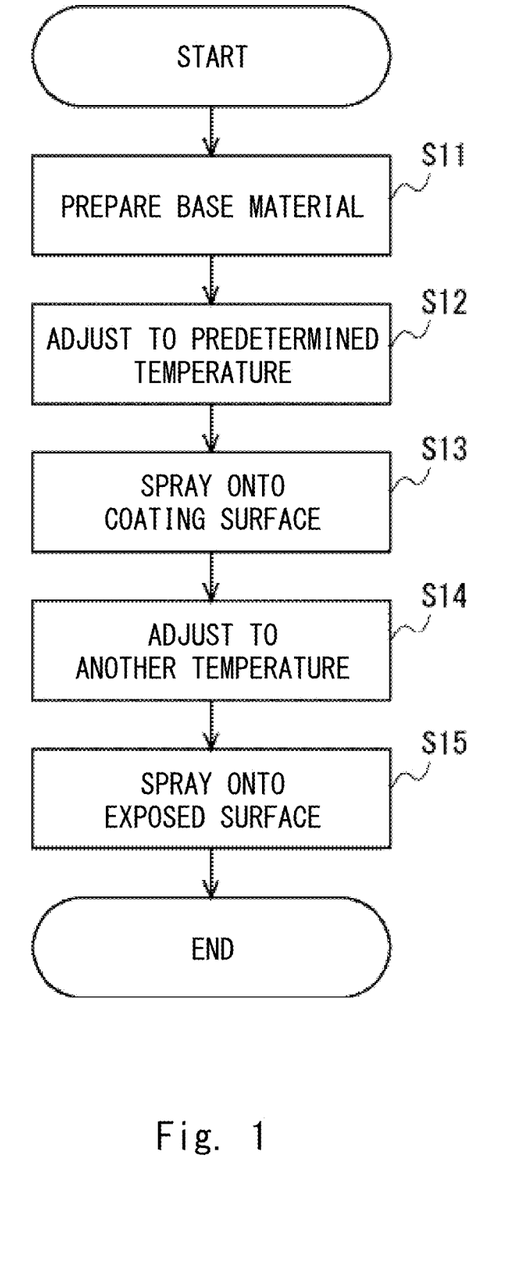
FIG. 1 shows a flow of a method of manufacturing a multi-layer electrode according to an embodiment.
Figure 2:
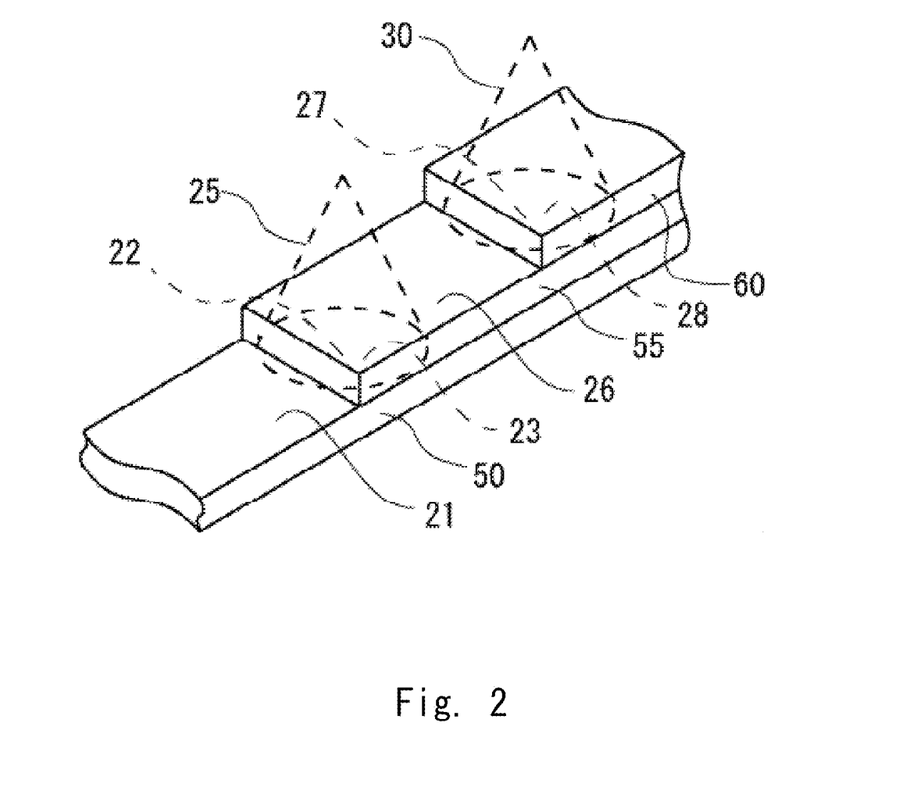
FIG. 2 is a schematic view of the method of manufacturing the multi-layer electrode according to the embodiment.

This embodiment relates to, as shown in FIG. 1, a method of manufacturing a multi-layer electrode used for a secondary battery. In this method, as shown in FIG. 2, a suspension liquid 25 is directly or indirectly sprayed onto a base material 50 as a first suspension liquid and a suspension liquid 30 is directly or indirectly sprayed onto the base material 50 as a second suspension liquid to form a multi-layer electrode layer. Alternatively, they are sequentially sprayed onto the base material 50 to form the multi-layer electrode layer. An ESD method may be preferably used as the spraying method. It is therefore possible to laminate thin films by the unit of material particles in the direction of the thickness of the electrode. In the ESD method, the thickness of even a thin film having a thickness of several tens of μm can be controlled.

Figure 3:
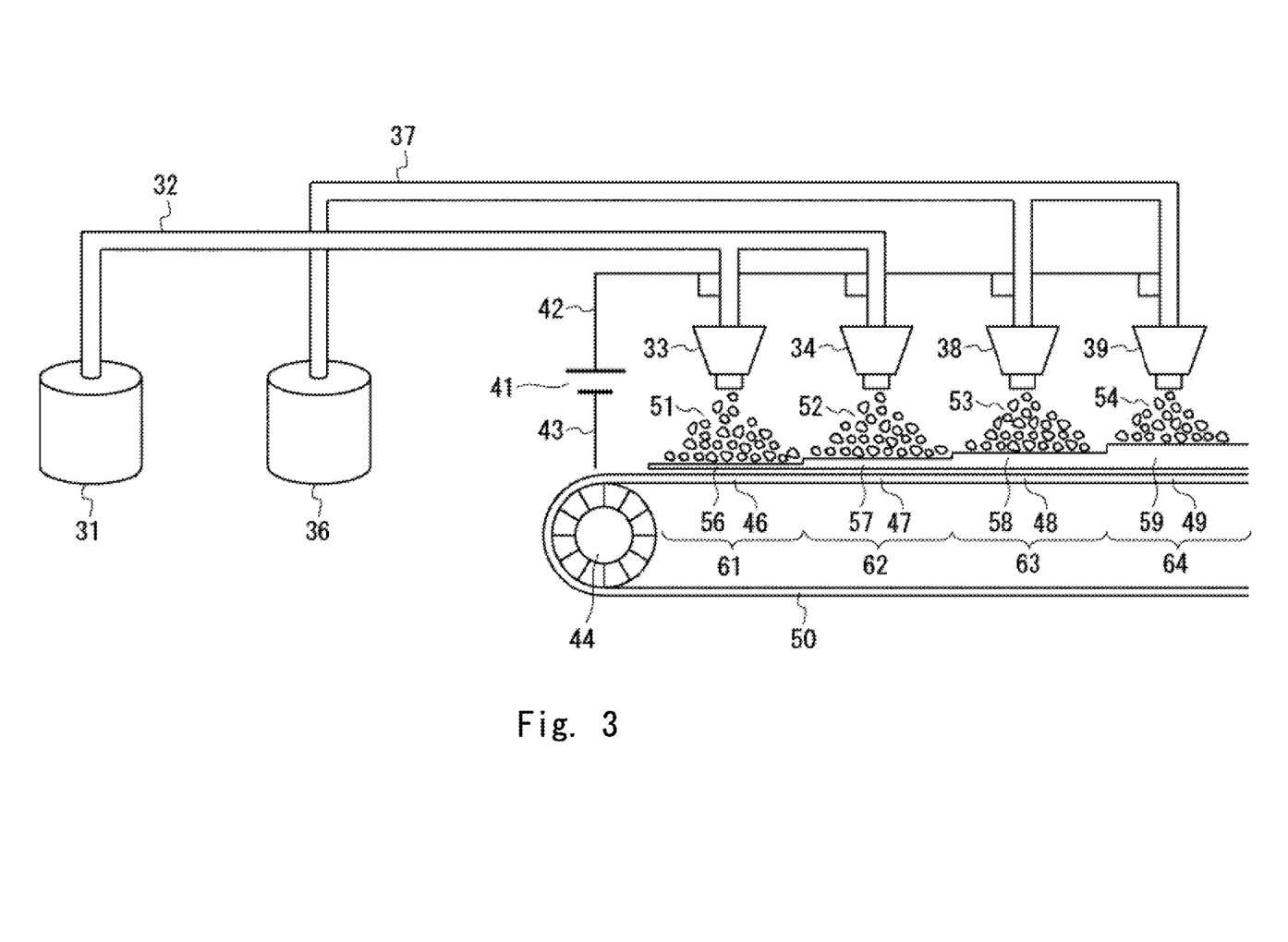
FIG. 3 is a schematic view of a method of manufacturing a multi-layer electrode according to an example.

As shown in FIG. 1, two or more electrode layers are formed by repeating the spraying process. Alternatively, as shown in FIG. 3 described later, four or more electrode layers may be formed. The multi-layer electrode includes, for example, electrode layers 55 and 60 shown in FIG. 2. In this embodiment, the electrode layers are successively formed from the front side to the back side of FIG. 2.

As shown in FIGS. 1 and 2, the process of forming the electrode layer includes the following processes. In Step S11, the base material 50 is prepared. The base material 50 is preferably arranged horizontally in order to form electrode layers 55 and 60 having a uniform thickness.

Next, in Steps S12 and S13, the suspension liquid 25 is sprayed onto the base material 50 having a predetermined temperature or a surface temperature. By spraying the suspension liquid, the electrode layer 55, which is a predetermined electrode layer, is formed. The electrode layer 55 is more proximal than the electrode layer 60 with respect to the base material 50.

The base material 50 may be a metallic foil, and may be an aluminium foil, for example, when a positive electrode is manufactured. The base material 50 may be a copper foil when a negative electrode is manufactured. Further, the base material 50 may be one or more electrode layers laminated onto a metallic foil in advance. In other words, one or more electrode layers may be provided in advance in the base material 50.

The suspension liquid 25 includes an active material. The active material may either be a positive electrode active material or a negative electrode active material. The positive electrode active material is, for example, a ternary positive electrode active material. The suspension liquid may further include a binder, conductive auxiliary agent, and solvent and may include other substances. The suspension liquid 25 may be slurry having viscosity.

Next, in Steps S14 and S15, the suspension liquid 30 is further sprayed onto the base material 50. At this time, the side of the base material 50, which is the electrode layer 55, has a temperature or a surface temperature different from the predetermined temperature or the surface temperature. The suspension liquid 30 may include the active material and further have a composition that is the same as or different from that of the suspension liquid 25. By spraying the suspension liquid 30, the electrode layer 60, which is distal with respect to the base material 50, is formed. As a variation example, the suspension liquid 30 may be sprayed onto another electrode layer provided on the electrode layer 55.

In summary, the method according to this embodiment includes the process of spraying the suspension liquid onto the base material or an existing electrode layer provided on the side of the base material having a predetermined surface temperature to form a primary electrode layer. This method further includes the process of spraying the suspension liquid onto the first electrode layer or another electrode layer having another surface temperature to form a subordinate electrode layer. Since temperature on the side of the base material differs, the active materials that have been sprayed solidify in ways different from each other. It is therefore possible to adjust the porosity for each electrode layer.

Details

With reference to FIGS. 1 and 2, the present invention will further be described. Step S13 is a process of forming the proximal electrode layer 55. Before Step S13, the temperature of a part or all of a surface 21 of the base material 50 arranged in Step S11 is adjusted to a temperature 23, which is a predetermined surface temperature (Step S12). Preferably, the base material 50 is arranged substantially horizontally.

In this embodiment, the surface 21 points vertically upward in the figure. In this embodiment, the temperature of a part of the surface 21 of the base material 50, which is a coating surface 22, is adjusted to have the temperature 23. In Step S13, the aforementioned suspension liquid 25 is sprayed onto the coating surface 22. The electrode layer 55 proximal with respect to the base material 50 is thus formed.

The temperature of a part or all of an exposed surface 26 of the electrode layer 55 is adjusted to a temperature 28, which is a surface temperature different from the temperature 23 (Step S14). The electrode layer 55 directly or indirectly contacts the base material 50. Therefore, by adjusting the temperature of the base material 50, the temperature of a part or all of a coating exposed surface 27 can be adjusted to the temperature 28.

In this embodiment, the exposed surface 26 points vertically upward in the figure. In this embodiment, the temperature of a part of the exposed surface 26 of the electrode layer 55, which is the coating exposed surface 27, is adjusted to have the temperature 28. In Step S15, the aforementioned suspension liquid 30 is sprayed onto the coating exposed surface 27 that has the temperature 28. The electrode layer 60 distal with respect to the base material 50 is thus formed.

In this embodiment, the base material 50 has been described as being a metallic foil. In a variation example of this embodiment, at the time before the proximal electrode layer 55 is formed, a base material may equip an electrode layer more proximal than the proximal electrode layer 55. The multi-layer electrode according to the manufacturing method according to such a variation example includes three or more electrode layers.

Problems and Effects

In general, the energy density of an electrode can be improved by increasing the thickness of an electrode layer and increasing the density of the electrode layer. When the thickness of a film increases or the number of voids decreases, however, the Li ion conductivity of the electrode layer decreases.

Normally, when a sufficient amount of electrolytic solution is held in the electrode, the Li ion conduction is not inhibited.

However, in the slot die coating described above, for example, it is difficult to freely design the porosity. It is therefore difficult to manufacture the electrode having a desired Li ion conductivity.

In this embodiment, the ESD method is used. In this embodiment, the temperature of the surface of the base or the electrode layer before the lamination is adjusted. It is therefore possible to control the state in which the material particles are deposited in the electrode thickness direction and the number of voids to hold the electrolyte when the multi-layer electrode is manufactured.

Example

1. Outline

As shown in FIG. 3, in this example, the suspension liquid was sprayed onto the base material four times to form first to fourth four electrode layers in order of proximity to the base material. As shown in FIG. 3, nozzles 33, 34, 38, and 39 were arranged in the direction in which the base material 50 was conveyed and a plurality of electrode layers were laminated. It was therefore possible to control the arrangement of the material particles such as the active material and voids between the material particles in the electrode thickness direction.

In this example, by using the above plurality of nozzles, it became possible to change the material composition of the suspension liquid to be sprayed by the ESD method. It was therefore possible to control the arrangement of the material particles in the thickness direction.

More particularly, it is possible to change the composition of the materials for each paste. For example, it is possible to freely set the material composition ratio of the active material, the binder, and the conductive auxiliary agent. Further, in this example, by using the ESD method, it is possible to form films at the particle level. It was therefore possible to freely design the material composition ratio in the electrode layer in the thickness direction.

There is another advantage to forming films at the particle level using the ESD method. It became easy to control solvent vaporizing conditions in the paste by adding heat to the base material 50. This has made it possible to control the size of the voids.

2. Formation of First Electrode Layer

In this example, as shown in FIG. 3, a conveyance roller 44 delivered the continuous strip-shaped base material 50. The base material 50 was an aluminium foil. When the electrode layer was formed, a predetermined area of the base material 50 was first conveyed to a predetermined conveyance position 61. After the conveyance, an area 46, which was a predetermined area, was positioned in the predetermined conveyance position 61.

In this example, a plurality of nozzles 33, 34, 38, and 39 were aligned in a direction parallel to the conveyance direction. The respective nozzles were opposed to the surface side of the base material 50 in which the electrode layer should be formed. The predetermined area of the base material 50 was conveyed from the upstream to the downstream in the direction parallel to the direction in which the nozzles were aligned. The same is true for the following conveyance. The conveyance may be performed without stopping or may be stopped in the conveyance position. The conveyance speed may be arbitrarily set.

In the predetermined conveyance position 61, the area 46 was opposed to the predetermined nozzle 33 of the plurality of nozzles. In the predetermined conveyance position 61, the temperature of the surface of the area 46 on the side of the nozzle was adjusted to a predetermined surface temperature (e.g., the aforementioned temperature 23). In this example, the temperature 23 was 60° C., which is a relatively low temperature.

When the temperature is adjusted, the temperature of the base material 50 may be adjusted by heating the base material 50 from the side of the surface opposite to the coating surface. In this example, the adjustment of the temperature was performed by adding heat to the solvent when the particles reached the base material 50 using a hot plate or an infrared lamp. In the following process, the method of adjusting the temperature is similar to that described above.

It is preferable that the temperature of the coating surface be measured in order to adjust the temperature more accurately. Such a measurement method may include a method of actually measuring the temperature of the coating surface. It is also possible to estimate the temperature of the coating surface from the ambient temperature, the temperature of a part of the base material other than the coating surface, or the temperature of a part around the coating surface. In the following process, the method of measuring the temperature is similar to that described above.

The nozzle 33 sprayed a suspension liquid 51 that contains the active material onto the surface (coating surface) of the area 46. An electrode layer 56, which is more proximal to the base material 50, was thus formed. The suspension liquid 51 was referred to as a paste A. The paste A contained ternary positive electrode active material 91% by weight, acetylene black (AB) 6% by weight as the conductive auxiliary agent, and polyvinylidene fluoride (PvDF,PVdF) 3% by weight as the binder. The above material particles were mixed in the solvent NMP to produce paste.

As shown in FIG. 3, the suspension liquid 51, which is the paste A, was supplied through a tank and a pipe. A tank 31 stored the paste A and sent the paste A to a pipe 32 as necessary. The pipe 32 received the paste A from the tank 31 and sent it to the nozzles 33 and 34. The nozzle 33 received the paste A from the pipe 32 and sprayed the paste A onto the coating surface of the base material 50 as the suspension liquid 51.

In this example, the electrode layer was formed using the ESD method. Therefore, as shown in FIG. 3, a wire 42 electrically connected the positive electrode of a DC power supply 41 and the nozzle 33. As will be described later, the wire 42 further connected the nozzles 34, 38, and 39 to the DC power supply 41. A wire 43 electrically connected the negative electrode of the DC power supply 41 and the base material 50. Therefore, the DC power supply 41 produced an electric field to make the nozzle 33 have a high potential between the nozzle 33 and the area 46.

While one DC power supply 41 is connected to the respective nozzles in this example, a plurality of DC power supplies may be provided for the respective nozzles or a group of nozzles. The wires 42 and 43 may be separately provided for the plurality of respective DC power supplies.

As shown in FIG. 3, the spray particles of the positively charged suspension liquid 51 emitted from the nozzle 33, flew through the electric field, and reached the surface of the area 46. The electrode layer 56, which is a predetermined electrode layer, was thus formed on the coating surface of the base material 50. It was further confirmed that the size of the voids or the porosity in the electrode layer 56 could be controlled by adjusting the temperature 23.

Note that the temperature 23 was higher than the temperature of the suspension liquid 51 before it was sprayed onto the base material 50. Accordingly, the solvent in the suspension liquid volatilized when the spray particles that had been sprayed reached the base material 50, whereby it was possible to easily adjust the size of the voids. The same is true for the temperatures 24, 28, and 29 and the suspension liquid 52, 53, and 54 described later.

3. Formation of Second Electrode Layer

Next, a predetermined area in which the electrode layer 56 was formed as described above and the proximal electrode layer 56 were conveyed toward a conveyance position 62. The conveyance position 62 was another conveyance position located further downstream of the conveyance position 61. After they were conveyed, an area 47, which is a predetermined area, was positioned in the conveyance position 62 in FIG. 3. In the conveyance position 62, the area 47 was opposed to the predetermined nozzle 34 of the plurality of nozzles.

In the conveyance position 62, the temperature of the exposed surface of the electrode layer 56 provided on the side of the base material 50 was a temperature 24 (not shown). The temperature 24 may be a temperature different from the temperature 23 or may be the same as the temperature 23. When the temperature 24 is higher than the temperature 23, the porosity of the electrode layer formed on the surface of the electrode layer 56 described later is larger than that of the electrode layer 56. In this example, the temperature 24 was 60° C., which is a rather low temperature.

The nozzle 34 sprayed a suspension liquid 52 that contained the active material onto the exposed surface of the electrode layer 56. The suspension liquid 52 sprayed onto the electrode layer 56 may have, as described above, a composition that is the same as or different from that of the suspension liquid 51 sprayed onto the base material 50. In this example, the suspension liquid 51 and 52 were the paste A having the same composition. When they have compositions different from each other, at least the contents of the conductive auxiliary agent may be different from each other.

As shown in FIG. 3, the suspension liquid 52, which is the paste A, was supplied through the tank and the pipe. The nozzle 34 received the paste A from the pipe 32 and sprayed the paste A onto the coating exposed surface of the electrode layer 56 as the suspension liquid 52.

As shown in FIG. 3, the wire 42 electrically connected the positive electrode of the DC power supply 41 and the nozzle 34. As described above, the wire 43 electrically connected the negative electrode of the DC power supply 41 and the base material 50. Therefore, the DC power supply 41 produced an electric field to make the nozzle 34 have a high potential between the nozzle 34 and the area 47.

As shown in FIG. 3, the nozzle 34 was another nozzle located in the downstream of the nozzle 33 of the above plurality of nozzles. The spray particles of the positively charged suspension liquid 51 emitted from the nozzle 33, flew through the electric field, and reached the coating exposed surface of the electrode layer 56.

From the above operation, the electrode layer more distal than the electrode layer 56 with respect to the base material was formed on the surface of the electrode layer 56. It was further confirmed that the size of the voids or the porosity in the electrode layer could be controlled by adjusting the temperature 24. The electrode layer thus formed and the electrode layer 56 were collectively shown as an electrode layer 57, which is the proximal electrode layer. As described above, the temperature 24 is preferably higher than the temperature of the suspension liquid 52 before it is sprayed onto the electrode layer 56. The continuous strip-shaped electrode layer was thus formed.

Instead of providing the first electrode layer, which is the electrode layer 56, one or more electrode layers may be provided in advance in the base material 50. The second electrode layer may be formed as the first electrode layer on the electrode layer provided in advance.

4. Formation of Third Electrode Layer

In this example, a predetermined area where the electrode layer 57 was formed as stated above and the electrode layer 57, which is the proximal electrode layer, were conveyed toward a conveyance position 63. The conveyance position 63 was another conveyance position which is located further downstream of the conveyance position 62. After they were conveyed, an area 48, which is a predetermined area, was positioned in the conveyance position 63 in FIG. 3. In the conveyance position 63, the area 48 was opposed to the predetermined nozzle 38 of the above plurality of nozzles.

In the conveyance position 63, the exposed surface of the electrode layer 57 was adjusted to a temperature different from the temperature 24. The temperature 28 is preferably higher than the temperature 24 (e.g., the aforementioned temperature 28). By setting such a temperature condition, the porosity of the electrode layer formed on the surface of the electrode layer 57 described later was larger than the porosity of the electrode layer 57. In this example, the temperature 28 was 120° C., which is a relatively high temperature.

The nozzle 38 sprayed a suspension liquid 53 that contained the active material onto the exposed surface of the electrode layer 57. The suspension liquid 53 may have a composition that is the same as or different from that of the suspension liquid 51 sprayed onto the base material 50 or the suspension liquid 52 sprayed onto the electrode layer 56, as described above.

In this example, the suspension liquid 53 was a paste B having a composition different from that of the suspension liquid 51 and 52. In this example, at least the contents of the conductive auxiliary agent were different from each other. The paste B contained ternary positive electrode active material 94% by weight, ternary positive electrode acetylene black (AB) 3% by weight, and polyvinylidene fluoride (PVdF) 3% by weight as the binder. The above material particles were mixed in the solvent NMP to produce paste.

The paste A is to form the electrode layer proximal with respect to the base material 50, which is a current collector foil. The paste B is to form the electrode layer distal with respect to the base material 50, which is the current collector foil. In this example, the paste A contained a smaller amount of conductive auxiliary agent than the paste B does (paste B contained a larger amount of conductive auxiliary agent than the paste A does).

Therefore, the electrode layer formed of the paste A is proximal with respect to the current collector foil and has a high electric conductivity. On the other hand, the electrode layer formed of the paste B is distal with respect to the current collector foil and has a relatively low electric conductivity. It is therefore possible to balance the whole electron conductivity in the electrode layer that includes a plurality of electrode layers like electrode layers 58 and 59 described later, for example.

As shown in FIG. 3, the suspension liquid 53, which is the paste B, was supplied through the tank and the pipe. A tank 36 stored the paste B and sent the paste B to a pipe 37 as necessary. The pipe 37 received the paste B from the tank 36 and sent it to the nozzles 38 and 39. The nozzle 38 received the paste B from the pipe 37 and sprayed the paste B onto the coating exposed surface of the electrode layer 57 as the suspension liquid 53.

As shown in FIG. 3, the wire 42 electrically connected the positive electrode of the DC power supply 41 and the nozzle 38. As described above, the wire 43 electrically connected the negative electrode of the DC power supply 41 and the base material 50. Therefore, the DC power supply 41 produced an electric field to make the nozzle 38 have a high potential between the nozzle 38 and the area 48.

The nozzle 38 was another nozzle of the plurality of nozzles which is located downstream of the nozzle 34. The spray particles of the positively charged suspension liquid 53 emitted from the nozzle 38, flew through the electric field, and reached the coating exposed surface of the electrode layer 57.

From the above processes, the electrode layer distal with respect to the base material was formed on the exposed surface of the electrode layer 57. Further, it was confirmed that the size of the voids or the porosity in the electrode layer could be controlled by adjusting the temperature 28. The electrode layer thus formed and the electrode layer 57 were collectively shown as an electrode layer 58. As described above, the temperature 28 is preferably higher than the temperature of the suspension liquid 53 before it is sprayed onto the electrode layer 57. The continuous strip-shaped electrode layer was thus formed.

In place of the first electrode layer or the electrode layer 56, one or more electrode layers may be provided in advance in the base material 50. The aforementioned second electrode layer may be formed on the electrode layer that has been provided in advance as the first electrode layer. Further, the third electrode layer may be formed as the second electrode layer.

5. Formation of Fourth Electrode Layer

In this example, the predetermined area in which the electrode layer 58 was formed described above and the electrode layer 58 were conveyed toward a conveyance position 64. The conveyance position 64 was another conveyance position located further downstream of the conveyance position 63. After they were conveyed, an area 49 as a predetermined area in FIG. 3 was located in the conveyance position 64. In the conveyance position 64, the area 49 was opposed to the predetermined nozzle 39 of the plurality of nozzles.

In the conveyance position 64, the temperature of the exposed surface of the electrode layer 58 was set to a temperature 29 (not shown). The temperature 29 may be a temperature different from the temperature 28 or may be the same as the temperature 28. When the temperature 29 is higher than the temperature 28, the porosity of the electrode layer formed on the surface of the electrode layer 58 described later is larger than the porosity of the electrode layer 58. In this example, the temperature 29 was 120° C., which is a relatively high temperature.

The nozzle 39 sprayed a suspension liquid 54 that contained the active material onto the exposed surface of the electrode layer 58. The suspension liquid 54 may have a composition that is the same as or different from that of the aforementioned suspension liquid 51, 52, and 53. In this example, the suspension liquid 54 was the paste B having a composition the same as that of the suspension liquid 53. When the suspension liquid 54 has a composition different from that of the suspension liquid 51, 52, and 53, at least the contents of the conductive auxiliary agent in the suspension liquid 54 may be different from those in the suspension liquid 51, 52, and 53.

As shown in FIG. 3, the suspension liquid 54, which is the paste B, was supplied through the tank and the pipe. The nozzle 39 received the paste B from the pipe 37 and sprayed the paste B onto the coating exposed surface of the electrode layer 58 as the suspension liquid 54.

As shown in FIG. 3, the wire 42 electrically connected the positive electrode of the DC power supply 41 and the nozzle 39. As described above, the wire 43 electrically connected the negative electrode of the DC power supply 41 and the base material 50. Therefore, the DC power supply 41 produced an electric field to make the nozzle 39 have a high potential between the nozzle 39 and the area 49.

The nozzle 39 was another nozzle of the plurality of nozzles which was located in the downstream of the nozzle 38. The spray particles of the positively charged suspension liquid 54 emitted from the nozzle 39, flew through the electric field, and reached the coating exposed surface of the electrode layer 58.

From the above processes, the electrode layer distal with respect to the base material was formed on the exposed surface of the electrode layer 58. Further, it was confirmed that the size of the voids or the porosity in the electrode layer could be controlled by adjusting the temperature 29. The electrode layer thus formed and the electrode layer 58 were collectively shown as an electrode layer 59. As already described above, the temperature 29 is preferably higher than the temperature of the suspension liquid 54 before the suspension liquid 54 is sprayed onto the electrode layer 58. The continuous strip-shaped electrode layer was formed as stated above.

6. Evaluation of Electrode

Figure 4:
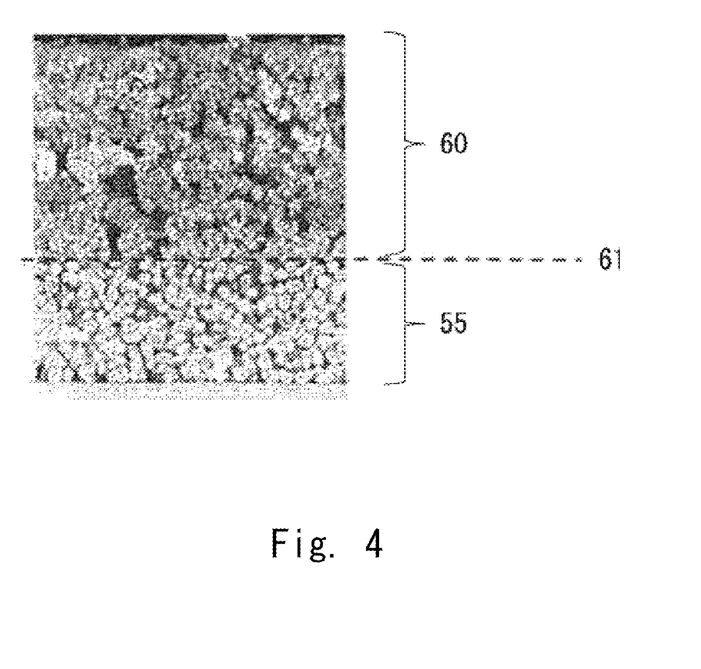
FIG. 4 is a cross-sectional photograph of the multi-layer electrode according to the example.

As shown in FIG. 4, the resulting electrode was observed by a scanning electron microscope (SEM) and the formation of voids in the electrode layer was evaluated.

As shown in the embodiment as well, the electrode layer 55 was proximal with respect to the base material 50. In this example, the electrode layer 55 was formed of the first electrode layer and the second electrode layer stated above. The electrode layer 60 was distal with respect to the base material 50. The electrode layer 60 was formed of the third electrode layer and the fourth electrode layer stated above.

In this example, the thickness of the electrode layer that could be formed by one nozzle was relatively small. By forming such a thin film a plurality of times under a constant surface temperature, the electrode layer having a desired thickness can be formed.

In this example, the electrode layer was formed twice by the ESD method to form the relatively sparse electrode layer 55. Further, the electrode layer was formed twice by the ESD method to form the relatively sparse electrode layer 60. Accordingly, the model electrode substantially formed of two layers: the electrode layers 55 and 60, each having a desired thickness, was prepared.

That is, by laminating the second electrode layer having voids similar to those in the first electrode layer on the surface of the first electrode layer, the electrode layer 55 having a desired thickness was obtained. In a similar way, by laminating the fourth electrode layer having voids similar to those in the third electrode layer on the surface of the third electrode layer, the electrode layer 60 having a desired thickness was obtained.

As described above, in the embodiment and the example, the porosity was regulated for each of the first to fourth electrode layers. This example shows that it is possible to form one electrode layer having a desired thickness by laminating two, three or more thin electrode layers. Further, in this example, the porosity in one electrode layer could be made uniform.

When the first to fourth electrode layers are formed, the respective temperatures of the surfaces onto which the suspension liquid is sprayed may be different from one another. Further, as described above, the temperature of one, two or more surfaces of the surfaces onto which the suspension liquid is sprayed may be the same as that of the other surfaces.

As described above, when the suspension liquid was sprayed onto the surface (coating surface) of the base material 50 or the like, the solvent was evaporated at a relatively slow pace since the temperature was relatively low. Therefore, the voids between the particles were filled with the other particles before the solvent was evaporated. Therefore, as shown in FIG. 4, the material particles became dense in the electrode layer 55.

Figure 5:
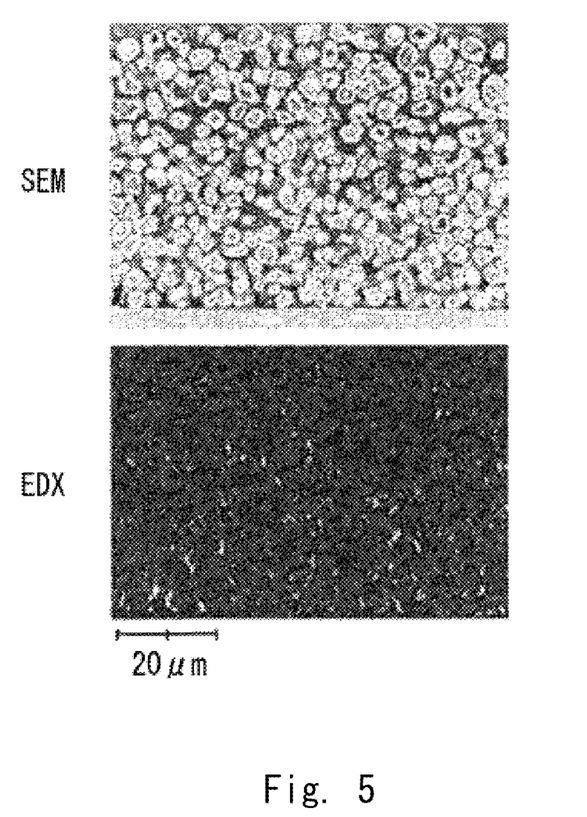
FIG. 5 is a cross-sectional photograph 1 of an electrode layer of the multi-layer electrode according to the example.

As shown in FIG. 5, the electrode layer 55 was further analyzed by Energy Dispersive X-ray Spectrometry (EDX). FIG. 5 shows an SEM image and an EDX image at the same magnification in the same location of the electrode layer 55. As shown in the EDX image, voids that are brightly shown occupied a relatively small area compared to the active material and the conductive auxiliary agent (AB) that are darkly shown.

According to the calculation by the image analysis, in the range of the EDX image, the active material ratio was 91%, the AB ratio was 6%, and the density of the electrode layer 55 was 1.7 g/cc. The above results show that the size of the voids has been successfully reduced by controlling the temperature of the surface which the suspension liquid reaches to be low.

As described above, when the suspension liquid was sprayed onto the surface (coating exposed surface) of the electrode layer provided on the surface of the base material 50, the solvent was evaporated at a relatively fast pace since the temperature was relatively high. Therefore, it was considered that the other particles could not easily flow before the solvent was evaporated. Therefore, the frequency at which the voids between the particles were filled with the other particles was low, and the material particles became sparse in the electrode layer 60 as shown in FIG. 4.

Figure 6:
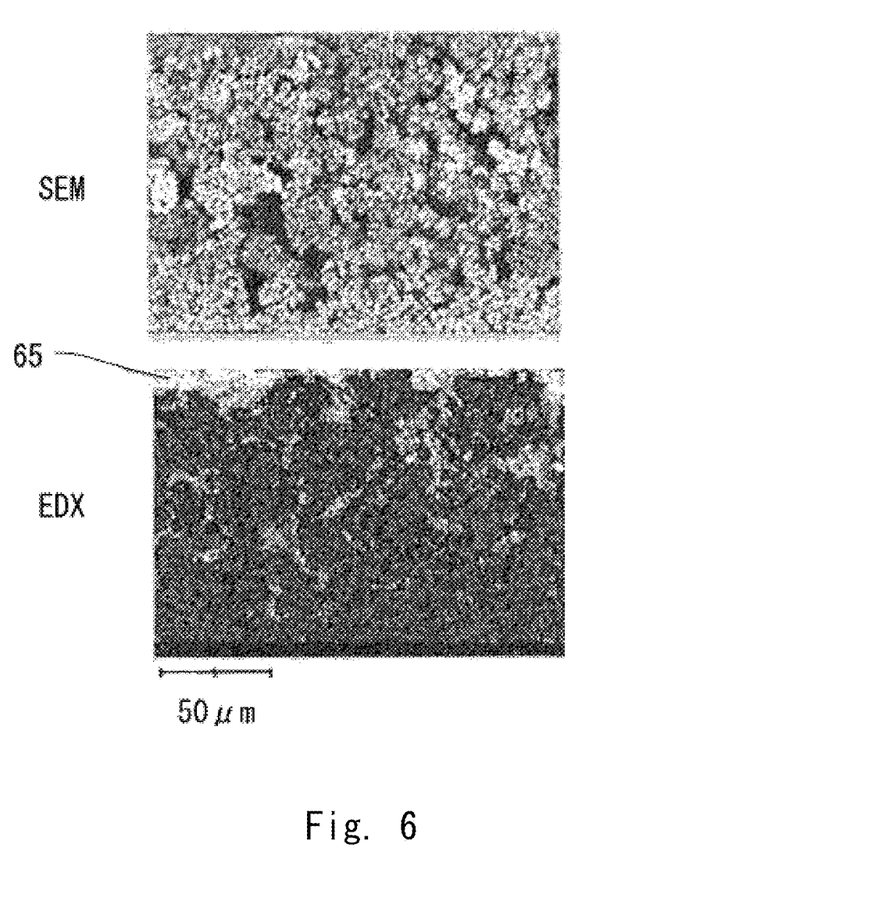
FIG. 6 is a cross-sectional photograph 2 of the electrode layer of the multi-layer electrode according to the example.

As shown in FIG. 6, the electrode layer 60 was further analyzed by EDX. FIG. 6 shows an SEM image and an EDX image at the same magnification in the same location of the electrode layer 60. Compared to FIG. 5, as shown in the EDX image, the voids 65 that are brightly shown occupied a relatively large area compared to the active material and the conductive auxiliary agent (AB) that are darkly shown.

According to the calculation by the image analysis, in the range of the EDX image, the active material ratio was 94%, the AB ratio was 3%, and the density of the electrode layer 55 was 1.0 g/cc. The above results show that the size of the voids has been successfully increased by controlling the temperature of the surface which the suspension liquid reaches to be high.

7. Comparative Example: Slot-Die Method

Figure 7:
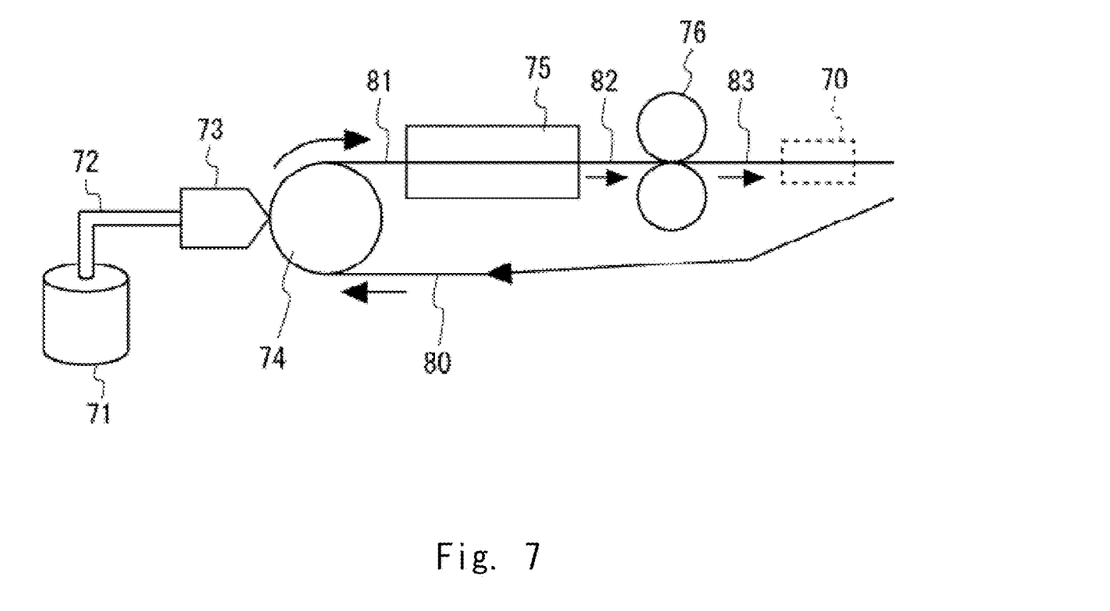
FIG. 7 is a schematic view of a method of manufacturing an electrode according to a comparative example.

As a comparative example, coating was performed by a slot-die method shown in FIG. 7.

As shown in FIG. 7, the paste including the active material, the binder, the conductive auxiliary agent, and the solvent similar to that in the example was stored in a tank 71. The tank 71 sent the paste to a pipe 72. The pipe 72 received the paste from the tank 71 and sent it to a slot die 73.

A drive roll (backup roll) 74 wound a metallic foil 80 onto itself and delivered it to the vicinity of the slot die 73. The slot die 73 received the paste from the pipe 72 and collectively coated the surface of the metallic foil 80 with a relatively large amount of paste. The drive roll 74 delivered the metallic foil 80 onto which the paste was applied to a drying oven 75 as a continuous strip-shaped laminated body 81. The drying oven 75 received the laminated body 81 from the drive roll 74 and dried the solvent in the electrode layer. The drying oven 75 sent a dried laminate 82 to a press 76.

Figure 8:
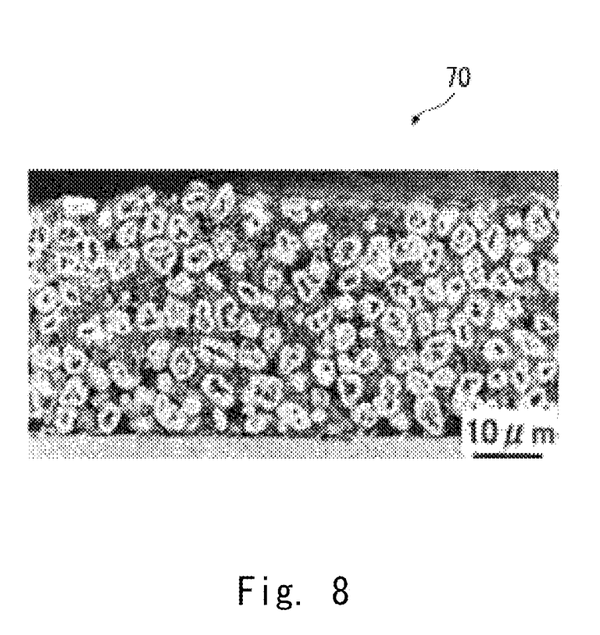
FIG. 8 is a cross-sectional photograph of the electrode according to the comparative example.

The press 76 received the dried laminate 82 from the drying oven 75, collectively adjusted the voids, and generated an electrode 83. The press 76 delivered the electrode 83. An electrode 70, which is a part of the continuous strip-shaped electrode 83, was observed by an SEM. FIG. 8 is an SEM image indicating the electrode layer of the electrode 70. As shown in the SEM image, in the comparative example, it was impossible to adjust the material particles and voids in the electrode thickness direction.

Compared to the example, there is a limitation in the thickness of the thin film formed by the coating method such as the method used in the comparative example which does not use the ESD. The limitation is considered to be about several tens of µm. Further, in such a method, the thin films tend to be mixed at the interface when the films are formed. On the other hand, in the method according to this example, it is possible to precisely form the electrode layer formed of a plurality of thin films, each having a desired thickness.

Further, in order to form the multi-layer electrode by the method according to this comparative example, the above processes need to be repeated a plurality of times to form each layer. That is, it is required to sequentially repeat the above processes to form the multiple layers. In the above comparative example, the metallic foil 80 needs to be applied to the electrode 83 again. Therefore, the number of process steps inevitably increase in order to increase the number of electrode layers.

It is typical in the slot-die method to control voids by the press. In this case, it is impossible to independently adjust the porosity of each layer. Therefore, there is no other choice but to collectively adjust the porosity of layers including the proximal electrode layer that has already been formed. It may be possible to collectively press the last layer. In this case, however, it is impossible to adjust voids for each electrode layer. Meanwhile, in this example, when the multi-layer electrode is formed, the size of the voids can be controlled for each electrode layer when the films are formed.

8. Discussion

In the above example, the arrangement of the material particles, the arrangement of the voids, and the size of the voids can be concurrently controlled when the electrode layer is formed. On the other hand, the slot die is used in the comparative example. Therefore, the plurality of electrode layers can be laminated only by the sequential method in the comparative example. It is therefore impossible to concurrently control the arrangement of the material particles, the arrangement of the voids, and the size of the voids.

Therefore, it has been shown in the example and the embodiment that the time required for the manufacturing process can be further reduced compared to the related sequential method. Note that the present invention is not limited to the above embodiment and example and may be changed as appropriate without departing from the spirit of the present invention. For example, the above multi-layer electrode may be used for a battery other than the secondary battery.

While the present invention has been described above with reference to the embodiment, the present invention is not limited to the above embodiment. Various changes that can be understood by those skilled in the art may be made on the configurations and the details of the present invention within the scope of the present invention.

This application is based upon and claims the benefit of priority from Japanese Patent Application No. 2013-181370, filed on Sep. 2, 2013, the disclosure of which is incorporated herein in its entirety by reference.

REFERENCE SIGNS LIST

21 SURFACE
22 COATING SURFACE
23 TEMPERATURE
25 SUSPENSION LIQUID
26 EXPOSED SURFACE
27 COATING EXPOSED SURFACE
28 TEMPERATURE
30 SUSPENSION LIQUID
31 TANK
32 PIPE
33, 34 NOZZLE
36 TANK
37 PIPE
38, 39 NOZZLE
41 DC POWER SUPPLY
42, 43 WIRE
44 CONVEYANCE ROLLER
46-49 AREA
50 BASE MATERIAL
51-54 SUSPENSION LIQUID
55-60 ELECTRODE LAYER
61-64 CONVEYANCE POSITION
65 VOID
70 ELECTRODE
71 TANK
72 PIPE
73 SLOT DIE
74 DRIVE ROLL (BACKUP ROLL)
75 DRYING OVEN
76 PRESS
80 METALLIC FOIL
81 LAMINATED BODY
82 DRIED LAMINATE
83 ELECTRODE

The invention claimed is:

1. A method of manufacturing a multi-layer electrode used for a secondary battery, the method comprising:
    a process of sequentially spraying two or more suspension liquids containing an active material and solvent, wherein the suspension liquids are not required to be a same composition, onto a base material to form a multi-layer electrode comprising two or more layers,
    wherein the process of forming the multi-layer electrode comprises:
    a process of spraying a first suspension liquid onto a surface having a predetermined temperature and evaporating a solvent in the first suspension liquid at the predetermined temperature in order to form a primary electrode layer, wherein the surface having the predetermined temperature is a surface of the base material or an existing electrode layer provided on the base material; and
    a process of spraying a second suspension liquid onto a second surface having a temperature adjusted to a second temperature higher than the predetermined temperature and evaporating a solvent in the second suspension liquid at the second temperature in order to form a subordinate electrode layer more distal than the primary electrode layer with respect to the base material, wherein the second surface having the second temperature is a surface of the primary electrode layer or another electrode layer.

2. The method of manufacturing the multi-layer electrode according to claim 1, wherein:
in the process of forming the primary electrode layer, the first suspension liquid is sprayed onto a surface of the base material,
in the process of forming the subordinate electrode layer, the second suspension liquid is sprayed onto a surface of a proximal electrode layer formed of one or more electrode layers including the primary electrode layer, and the surface of the proximal electrode layer has the second temperature.

3. The method of manufacturing the multi-layer electrode according to claim 1, wherein:
in the process of forming the primary electrode layer, the first suspension liquid is sprayed onto a surface of the existing electrode layer formed of one or more electrode layers,
in the process of forming the subordinate electrode layer, the second suspension liquid is sprayed onto a surface of a proximal electrode layer formed of two or more electrode layers including the primary electrode layer, and
the surface of the proximal electrode layer has the second temperature.

4. The method of manufacturing the multi-layer electrode according to claim 1, wherein:
in the process of forming the primary electrode layer, the first suspension liquid is sprayed onto a surface of the base material or the existing electrode layer, the surface having the predetermined temperature,
prior to the process of forming the subordinate electrode layer, a process of adjusting a temperature of a part or all of a surface of a proximal electrode layer formed of one, or more electrode layers including the primary electrode layer to the other second temperature is further included, and
in the process of forming the subordinate electrode layer, the second suspension liquid is sprayed onto the surface of the proximal electrode layer having the second temperature.

5. The method of manufacturing the multi-layer electrode according to claim 4, wherein prior to the process of forming the primary electrode layer, a process of adjusting a temperature of a part or all of a surface of the base material or the existing electrode layer to the predetermined temperature is further included.

6. The method of manufacturing the multi-layer electrode according to claim 4, wherein a part or all of the surface of the proximal electrode layer is adjusted to the second temperature by adjusting the temperature of the base material.

7. The method of manufacturing the multi-layer electrode according to claim 1, wherein:
in the process of forming the multi-layer electrode, a continuous strip-shaped base material is delivered,
prior to the process of forming the primary electrode layer, a predetermined area of the base material or the existing electrode layer is conveyed to a predetermined conveyance position from upstream to downstream in parallel to a direction in which a plurality of nozzles opposed to a surface side of the base material are aligned,
a temperature of a surface of the predetermined area is adjusted to the predetermined temperature in the predetermined conveyance position,
in the process of forming the primary electrode layer, the first suspension liquid is sprayed onto a surface of the predetermined area by a predetermined nozzle of the plurality of nozzles,
prior to the process of forming the subordinate electrode layer, the predetermined area and the primary electrode layer are further conveyed to another conveyance position in the downstream,
in the other conveyance position, a temperature of a surface of a proximal electrode layer formed of one, or more electrode layers including the primary electrode layer is adjusted to the second temperature, and
in the process of forming the subordinate electrode layer, the second suspension liquid is sprayed onto a surface of the proximal electrode layer by another nozzle located in the downstream of the predetermined nozzle of the plurality of nozzles to form a continuous strip-shaped multi-layer electrode.

8. The method of manufacturing the multi-layer electrode according to claim 1, wherein the second suspension liquid has a composition the same as that of the first suspension liquid.

9. The method of manufacturing the multi-layer electrode according to claim 1, wherein at least contents of a conductive auxiliary agent in the second suspension liquid are different from those in the first suspension liquid.

10. The method of manufacturing the multi-layer electrode according to claim 1, wherein:
the predetermined temperature is higher than the temperature of the first suspension liquid before it is sprayed onto the base material, and
the second temperature is higher than the temperature of the second suspension liquid before it is sprayed onto the primary electrode layer or the other electrode layer.

11. The method of manufacturing the multi-layer electrode according to claim 1, wherein the base material is a metallic foil.

* * * * *